US008058382B2

(12) United States Patent
Richter et al.

(10) Patent No.: US 8,058,382 B2
(45) Date of Patent: Nov. 15, 2011

(54) URETDIONE FORMATION IN SOLUTION

(75) Inventors: Frank Richter, Leverkusen (DE);
Hans-Josef Laas, Odenthal (DE);
Reinhard Halpaap, Odenthal (DE);
Andreas Hecking, Langenfeld (DE)

(73) Assignee: Bayer MaterialScience AG, Leverkusen (DE)

( * ) Notice: Subject to any disclaimer, the term of this patent is extended or adjusted under 35 U.S.C. 154(b) by 1441 days.

(21) Appl. No.: 11/333,575

(22) Filed: Jan. 17, 2006

(65) Prior Publication Data

US 2006/0173152 A1 Aug. 3, 2006

(30) Foreign Application Priority Data

Jan. 21, 2005 (DE) .................. 10 2005 002 867

(51) Int. Cl.
*C08G 18/79* (2006.01)
*C08G 18/80* (2006.01)
*C07C 263/16* (2006.01)
*C07C 265/00* (2006.01)
*C07D 229/00* (2006.01)

(52) U.S. Cl. ......... 528/73; 252/182.2; 528/45; 540/202; 548/951; 548/952; 560/330; 560/336

(58) Field of Classification Search .................. 528/45, 528/73; 540/202; 548/951, 952; 252/182.2; 560/330, 336
See application file for complete search history.

(56) References Cited

U.S. PATENT DOCUMENTS

| 3,496,234 | A | * | 2/1970 | van Leeuwen | .................. 568/9 |
| 4,476,054 | A | | 10/1984 | Disteldorf et al. | ......... 260/239 A |
| 4,912,210 | A | | 3/1990 | Disteldorf et al. | ............ 540/202 |
| 4,929,724 | A | | 5/1990 | Engbert et al. | ................. 540/202 |
| 2002/0028930 | A1 | * | 3/2002 | Laas et al. | ..................... 540/202 |
| 2004/0049028 | A1 | | 3/2004 | Laas et al. | ..................... 540/202 |
| 2004/0059082 | A1 | | 3/2004 | Laas et al. | ......................... 528/65 |
| 2004/0106789 | A1 | | 6/2004 | Richter et al. | ................ 540/202 |

FOREIGN PATENT DOCUMENTS

| EP | 0 780 377 A1 | 6/1997 |
| GB | 1153815 | 5/1969 |
| JP | 11-228524 | 8/1999 |

OTHER PUBLICATIONS

Database WPI Section Ch, Week 199944 Derwent Publication Ltd., London, GB; AN 1999-522662 XP002382268 & JP 11 228524 A (Nippon Polyurethane Kogyo KK) Aug. 24, 1999.
Laas H J et al: "Zur Synthese Aliphatischer Polyisocyanate—Lackpolyisocyanate Mit Biuret-, Isocyanurat- Oder Uretdionstruktur the Synthesis of Aliphatic Polyisocyanates Containing Biuret, Isocyanurate or Uretdione Backbones for Use in Coatings" Jan. 1994, Journal Fur Praktische Chemie, Chemiker Zeitung, Wiley VCH, Weinheim, DE, pp. 185-200, XP000441642.

* cited by examiner

*Primary Examiner* — Rabon Sergent
(74) *Attorney, Agent, or Firm* — Connolly Bove Lodge & Hutz LLP

(57) ABSTRACT

The invention relates to a process for preparing polyisocyanates having a high uretdione group content by phosphine-catalysed isocyanate oligomerization in the presence of organic carbonates and/or nitriles.

11 Claims, 2 Drawing Sheets

URETDIONE FORMATION IN SOLUTION

CROSS-REFERENCE TO RELATED APPLICATION

This application claims priority under 35 U.S.C. §119 (a)-(d) to German application DE 10 2005 002 867, filed Jan. 21, 2005.

FIELD OF THE INVENTION

This invention relates to a process for preparing polyisocyanates having a high uretdione group content by phosphine-catalysed isocyanate oligomerization in the presence of organic carbonates or nitriles.

BACKGROUND OF THE INVENTION

Aliphatic isocyanates having uretdione groups are valuable raw materials for, inter alia, producing polyurethane coatings. Products based on optionally branched, linear-aliphatic diisocyanates have a particularly low viscosity. Products based on cycloaliphatic diisocyanates are generally highly viscous to solid substances which can be used as elimination product-free, internally blocked crosslinkers in coating systems. A summary is provided in J. Prakt. Chem./Chem. Ztg. 1994, 336, 185-200.

Tris(dialkylamino)phosphines (DE-A 3 030 513), if appropriate in combination with cocatalysts (DE-A 3 437 635), display good selectivity for the formation of uretdione groups (uretdione selectivity). However, the serious problem of the high carcinogenic potential of their phosphorus oxides, e.g. hexamethylphosphoramide, stands in the way of their industrial use.

DE-A 3 739 549 discloses the catalytic NCO dimerization using 4-dialkylamino-pyridines, e.g. 4-dimethylaminopyridine (DMAP), although uretdione formation proceeds selectively only in the case of specific cycloaliphatic isocyanates such as isophorone diisocyanate (IPDI). Linear-aliphatic isocyanates such as hexamethylene diisocyanate (HDI) and also branched, linear-aliphatic isocyanates such as trimethylhexane diisocyanate (TMDI) and methylpentane diisocyanate (MPDI) give mainly strongly coloured, heterogeneous reaction products when DMAP and related compounds are used.

DE-A 1 670 720 discloses the preparation of aliphatic polyisocyanates having uretdione groups, with tertiary phosphines having at least one aliphatic substituent and also boron trifluoride and its adducts being used as catalysts. The uretdione selectivity here is temperature-dependent, and appreciable amounts of viscosity-increasing isocyanate trimers (isocyanurates and iminooxadiazinediones) and, particularly at temperatures of >80° C., other undesirable by-products such as carbodiimides or uretonimines are always formed.

One way of increasing the uretdione selectivity and decreasing the by-product formation is the use of specific, bulky phosphines having P-bonded cycloalkyl groups (EP-A 1 422 223, unpublished German Patent Application DE 10354544). The fact that the uretdione selectivity for a given phosphine catalyst can be improved by addition of additives or solvents has been examined in JP 11228524. According to this, nonaromatic solvents having a Hildebrand solubility parameter of greater than 7 $cal^{1/2}\, cm^{-3/2}$ are suitable for preparing polyisocyanates rich in uretdione groups in the presence of phosphine catalysts. However, as has been able to be shown in the examples of the present patent application, this is not always reliably the case (cf. chloroform; Hildebrand parameter 9.3 $cal^{1/2}\, cm^{-3/2}$, compared to N-methylpyrrolidone, NMP; Hildebrand parameter 11.3 $cal^{1/2}\, cm^{-3/2}$). Consequently, a person skilled in the art cannot derive any general teaching as to which solvents are reliably suitable for increasing the uretdione selectivity and reducing by-product formation and which are not from JP 11228524.

In addition, numerous publications disclose carrying out isocyanate oligomerizations in the presence of solvents in general terms without, however, naming individual compounds and/or specifically indicating compounds which lead to an improvement in the uretdione selectivity and a reduction in by-product formation.

It has now been found that the paired use of phosphines and organic carbonates and/or organic nitriles as catalyst system has a particularly advantageous effect on the selectivity of uretdione formation.

SUMMARY OF THE INVENTION

The invention therefore provides for the use of organic carbonates and/or organic nitriles in the phosphine-catalysed oligomerization of monoisocyanates and/or polyisocyanates to form uretdiones in order to achieve an increase in selectivity in the oligomerization.

The invention further provides a process for preparing polyisocyanates containing uretdione groups, in which polyisocyanates are oligomerized in the presence of a catalyst system comprising phosphines and organic carbonates and/or organic nitriles.

BRIEF DESCRIPTION OF THE DRAWINGS

The invention is further illustrated by the following non-limiting drawings in which.

DETAILED DESCRIPTION OF PREFERRED EMBODIMENTS

Figure 1:
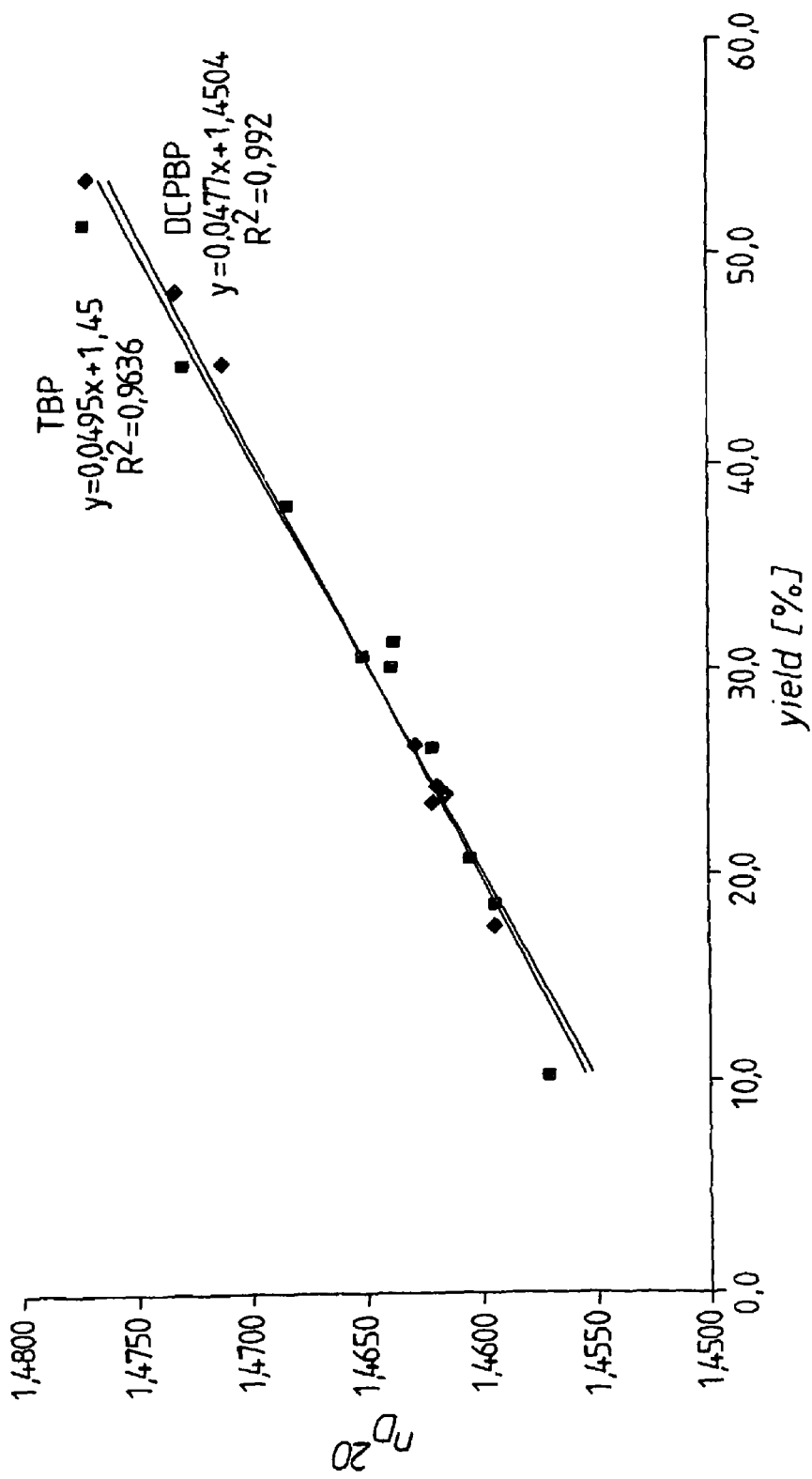
FIG. 1 is a calibration curve as described in Example 1.

As used herein in all sections of this document, including as used in the examples and unless otherwise expressly specified, all numbers may be read as if prefaced by the word "about", even if the term does not expressly appear. Also, any numerical range recited herein is intended to include all subranges subsumed therein.

As polyisocyanates, it is possible to use all aliphatic, cycloaliphatic and/or aralphatic polyisocyanates having an NCO functionality of preferably $\geq 2$ which are known per se to those skilled in the art. It is unimportant whether these have been prepared by means of phosgene or by phosgene-free processes. If desired, small amounts of monoisocyanates can also be used concomitantly, but this is not preferred.

Preference is given to using aliphatic and/or cycloaliphatic polyisocyanates, either individually or in any mixtures with one another.

Examples of suitable polyisocyanates are the isomeric pentane diisocyanates, hexane diisocyanates, heptane diisocyanates, octane diisocyanates, nonane diisocyanates, decane diisocyanates, undecane diisocyanates and dodecane diisocyanates and also isophorone diisocyanate (IPDI), bis(isocyanatocyclohexyl)-methane ($H_{12}$MDI), bis(isocyanatomethyl)benzene (xylylene diisocyanate, XDI) and bis(2-isocyanatoprop-2-yl)benzene (tetramethylxylylene diisocyanate, TMXDI).

Particular preference is given to using hexamethylene diisocyanate (HDI), methylpentane diisocyanate (MPDI), trimethylhexane diisocyanate (TMDI), bis(isocyanatomethyl)cyclohexane ($H_6XDI$) and norbornane diisocyanate (NBDI), either individually or in any mixtures with one another, as polyisocyanates.

Of course, the higher molecular weight NCO-functional reaction products based on the abovementioned polyisocyanates and containing isocyanurate, uretdione, iminooxadiazinetrione, urethane, allophanate and/or biuret structures can also be used as polyisocyanates in the process of the invention.

As phosphines, use is made of tertiary phosphines having alkyl and/or aryl groups as substituents, with these also being able to be substituted.

Examples of preferred tertiary phosphines are those having three alkyl substituents, e.g.: trimethylphosphine, triethylphosphine, tripropylphosphine, tributylphosphine, cyclopentyl-dimethylphosphine, pentyldimethylphosphine, cyclopentyldiethylphosphine, pentyldiethylphosphine, cyclopentyldipropylphosphine, pentyldipropylphosphine, cyclopentyldibutylphosphine, pentyldibutylphosphine, cyclopentyldihexylphosphine, pentyldihexylphosphine, dicyclopentylethylphosphine, dipentylmethylphosphine, dicyclopentylethylphosphine, dipentylethylphosphine, dicyclopentylpropylphosphine, dipentylpropylphosphine, dicyclopentylbutylphosphine, dipentylbutylphosphine, dicyclopentylpentylphosphine, dicyclopentylhexylphosphine, dipentylhexylphosphine, dicyclopentyloctylphosphine, dipentyloctylphosphine, tricyclo-pentylphosphine, tripentylphosphine, cyclohexyldimethylphosphine, hexyldimethylphosphine, cyclohexyldiethylphosphine, hexyldiethylphosphine, cyclohexyldipropylphosphine, hexyldipropylphosphine, cyclohexyldibutyl-phosphine, hexyldibutylphosphine, cyclohexyldihexylphosphine, cyclohexyldioctylphosphine, dicyclohexylmethylphosphine, dihexylmethylphosphine, dicyclohexylethylphosphine, dihexylethylphosphine, dicyclohexylpropylphosphine, dihexylpropylphosphine, dicyclohexylbutylphosphine, dihexylbutylphosphine, dicyclohexylhexylphosphine, dicyclohexyl-octylphosphine, tricyclohexylphosphine, trihexylphosphine, trioctylphosphine, norbornyldimethylphosphine, norbornyldiethylphosphine, norbornyldi-n-propylphosphine, norbornyldiisopropylphosphine, norbornyldibutylphosphine norbornyldihexylphosphine, norbornyldioctylphosphine, dinorbornylmethylphosphine, dinorbornylethylphosphine, dinorbornyl-n-propylphosphine, dinorbornylisopropylphosphine, dinorbornylbutylphosphine, dinorbornyl-hexylphosphine, dinorbornyloctylphosphine, trinorbornylphosphine, dimethyl(1,7,7-trimethylbicyclo[2.2.1]hept-2-yl)phosphine, diethyl(1,7,7-trimethylbicyclo[2.2.1]hept-2-yl)phosphine, di-n-propyl(1,7,7-trimethyl-bicyclo[2.2.1]hept-2-yl)phosphine, diisopropyl(1,7,7-trimethylbicyclo[2.2.1]hept-2-yl)phosphine, dibutyl(1,7,7-trimethylbicyclo[2.2.1]hept-2-yl)phosphine, dihexyl(1,7,7-trimethylbicyclo[2.2.1]hept-2-yl)phosphine, dioctyl(1,7,7-trimethyl-bicyclo[2.2.1]hept-2-yl) phosphine, methylbis(1,7,7-trimethylbicyclo[2.2.1]hept-2-yl)phosphine, ethylbis(1,7,7-trimethylbicyclo[2.2.1]hept-2-yl)phosphine, propylbis(1,7,7-trimethylbicyclo[2.2.1]hept-2-yl)phosphine, butylbis(1,7,7-trimethylbicyclo[2.2.1]hept-2-yl)phosphine, hexylbis(1,7,7-trimethyl-bicyclo[2.2.1]hept-2-yl)phosphine, octylbis(1,7,7-trimethylbicyclo[2.2.1]hept-2-yl)phosphine, dimethyl(2,6,6-trimethylbicyclo[3.1.1]hept-3-yl)phosphine, diethyl2,6,6-trimethylbicyclo[3.1.1]hept-3-yl)phosphine, dipropyl(2,6,6-trimethylbicyclo[3.1.1]hept-3-yl)phosphine, dibutyl(2,6,6-trimethylbicyclo-[3.1.1]hept-3-yl)phosphine, dihexyl(2,6,6-trimethylbicyclo[3.1.1]hept-3-yl)phosphine, dioctyl(2,6,6-trimethylbicyclo[3.1.1]hept-3-yl)phosphine, methylbis(2,6,6-trimethylbicyclo[3.1.1]hept-3-yl)phosphine, ethylbis(2,6,6-trimethylbicyclo[3.1.1]hept-3-yl)phosphine, propylbis(2,6,6-trimethyl-bicyclo[3.1.1]hept-3-yl)phosphine, butylbis(2,6,6-trimethylbicyclo[3.1.1]hept-3-yl)phosphine, hexylbis(2,6,6-trimethylbicyclo3.1.1]ept-3-yl)phosphine and octylbis(2,6,6-trimethylbicyclo[3.1.1]hept-3-yl)phosphine.

These can be used either individually, in any mixtures with one another or in mixtures with other primary, secondary and/or tertiary alkyl phosphines, aralkyl phosphines and/or aryl phosphines as catalyst for uretdione formation.

The amount of the catalyst to be used in the process of the invention depends first and foremost on the desired reaction rate and is from 0.01 to 5 mol %, based on the sum of the molar amounts of the isocyanate used and the catalyst. Preference is given to using from 0.05 to 3 mol % of catalyst.

The organic carbonates used in B) correspond to the general formula (I)

$$R^1O-C(O)-OR^2 \qquad (I)$$

where $R^1$ and $R^2$ are, independently of one another, identical or different $C_1$-$C_{20}$ radicals which are linear, branched or form parts of cyclic ring systems and may contain heteroatoms.

Examples of such carbonates are dimethyl carbonate, diethyl carbonate, dipropyl carbonate, dibutyl carbonate, dipentyl carbonate, dihexyl carbonate, dioctyl carbonate, diphenyl carbonate, diallyl carbonate, ditolyl carbonate, butyl phenyl carbonate, 1,3-dioxolan-2-one (ethylene carbonate), 4-methyl-1,3-dioxolan-2-one (propylene carbonate), 4-ethyl-1,3-dioxolan-2-one (butylene carbonate), 4-propyl-1,3-dioxolan-2-one, 4-vinyl-1,3-dioxolan-2-one, 1,3-dioxan-2-one (trimethylene carbonate), 5-dimethyl-1,3-dioxan-2-one (neopentylene carbonate), 4-methoxy-methyl-1,3-dioxolan-2-one, 4-ethoxymethyl-1,3-dioxolan-2-one, 4-phenoxy-methyl-1,3-dioxolan-2-one, 4-acetoxymethyl-1,3-dioxolan-2-one, erythritol bis(carbonate) and 2,5-dioxahexanoate.

Organic carbonates used are preferably ones having a cyclic structure such as 1,3-dioxolan-2-one (ethylene carbonate), 4-methyl-1,3-dioxolan-2-one (propylene carbonate), 4-ethyl-1,3-dioxolan-2-one (butylene carbonate) or glycerol carbonates in which the O-bonded hydrogen of the exocyclic —$CH_2OH$ group has been replaced by NCO-unreactive substituents such as optionally substituted alkyl, acyl, aryl or aralkyl groups.

The organic nitriles used according to the invention in B) correspond to the general formula (I)

$$R-CN \qquad (I)$$

where R is an optionally substituted (in particular by further nitrile groups), optionally heteroatom-containing, linear, branched or cyclic $C_1$-$C_{20}$ radical.

Examples of such nitriles are acetonitrile and substituted derivatives, e.g. diphenylacetonitrile or fluorophenylacetonitrile (or isomers), acrylonitrile, propionitrile, butyronitrile, valeronitrile, hexanenitrile, heptanenitrile, octanenitrile, malono(di)nitrile, glutaronitrile, succinonitrile, adiponitrile, all isomeric tris(cyano)hexanes, benzonitrile, benzyl cyanide, benzodinitriles (all isomers), benzotrinitriles (all isomers), cyanoacetic esters such as methyl cyanoacetate, ethyl cyanoacetate, etc., N,N-disubstituted cyanoacetamides such as N,N-dimethyl-2-cyanoacetamide or O-substituted cyanohydrins such as 3-methoxypropionitrile.

Preferred nitriles are acetonitrile, adiponitrile, succinonitrile and 1,3,5-tris(cyano)hexane.

The amount of the component B) to be used according to the invention can vary within wide limits, and it is industrially advantageous to use as little as possible thereof since it reduces the space-time yield of uretdione polyisocyanate.

However, in the case of the nitriles, a considerable acceleration of the reaction frequently occurs, so that the above-mentioned disadvantage of the lowering of the space-time yield when using these additives can even be overcompensated.

Preference is given to using from 2 to 50% by weight, preferably from 5 to 30% by weight, of additive or component B), based on the amount of isocyanate to be oligomerized.

The process of the invention is, depending on the pressure selected and the boiling point of the compounds of the component B), carried out in the temperature range from 0° C. to 150° C., preferably from 0° C. to 80° C., particularly preferably from 0° C. to 60° C., very particularly preferably from 0° C. to 40° C.

The process of the invention is carried out so that the conversion of the NCO groups is from 5 to 90 mol %, preferably from 10 to 60 mol %, very particularly preferably from 10 to 50 mol %.

The reaction is typically stopped after the desired degree of conversion has been reached. This can in principle be effected by means of all previously described catalyst poisons (DE-A 1670667, 1670720, 1934763, 1954093, 3437635, U.S. Pat. No. 4,614,785) such as alkylating agents (e.g. dimethyl sulphate, methyl toluene sulphonate), organic or inorganic peroxides, acid chlorides and sulphur, which are reacted with the catalyst, if appropriate with an increase in the temperature (Variant A).

After the deactivation of the reaction mixture in accordance with Variant A, unreacted monomer, the deactivated catalyst and/or the additive of the component B) which has been used concomitantly can be separated off.

However, the process can also be carried out without chemical deactivation of the catalyst. In this case, the active catalyst is separated off from the reaction mixture in order to prevent further reaction after the desired conversion has been reached (Variant B).

At the same time as or after the removal of the catalyst, unreacted residual monomer and/or additive can be separated off from the reaction mixture which has been treated in accordance with Variant B.

In the process of the invention, all known separation techniques such as distillation, extraction or crystallization/filtration can be used for separating off unreacted monomers, the catalyst and/or the additives which have been used concomitantly and also optionally other constituents from the reaction mixture.

Preference is given to distillation, if appropriate in the specific embodiment of thin film distillation. Of course, combinations of two or more of these techniques can also be employed.

To stop the reaction in accordance with Variant B, the catalyst is preferably removed by distillation, with any unreacted monomer and/or the carbonate and/or nitrile concomitantly used being removed at the same time.

Particular preference is given to removing the residual monomer present and/or the additive used concomitantly by distillation in the work-up of a reaction stopped in accordance with Variant A or B.

If the polyisocyanate prepared according to the invention is still to contain free, unreacted monomer, as is of interest, for example, for further processing to produce NCO-blocked products or low-NCO or NCO-free polyuretdione hardeners, e.g. for the powder coatings field, the removal of monomer and/or the removal of the carbonate and/or nitrile used concomitantly can be dispensed with after the reaction has been stopped (Variants A and B).

In carrying out the process of the invention, it is immaterial whether the process is carried out entirely or partly batchwise or continuously.

Furthermore, additives and stabilizers customary in polyisocyanate chemistry can be added at any point in time in the process of the invention. Examples are antioxidants such as sterically hindered phenols (2,6-di-tert-butylphenol, 4-methyl-2,6-di-tert-butylphenol), light stabilizers such as HALS amines, triazoles, etc., weak acids or catalysts for the NCO—OH reaction, e.g. dibutyltin dilaurate (DBTL).

It can also be useful to add small amounts of a catalyst poison of the type to be used in Variant A to a product worked up in accordance with Variant B in order to increase the redissociation stability and to suppress the tendency to form by-products, to discolour or for the free NCO groups to react further with one another, e.g. during product storage.

Products prepared by the process of the invention on the basis of optionally branched, linear-aliphatic diisocyanates or polyisocyanates having no cycloalkyl substituents are light in colour and have a viscosity of <1000 mPas/23° C. If cycloaliphatic and/or aralipahtic diisocyanates or polyisocyanates are used, highly viscous to solid resins are obtained (viscosity>10 000 mPas/23° C.).

In low monomer form, i.e. after unreacted monomer has been separated off, the products according to the invention have an NCO content of <27% by weight, preferably <25% by weight.

The polyisocyanates prepared by the process of the invention serve as starting materials for the production of, for example, shaped bodies (optionally foamed), paints and varnishes, coating compositions, adhesives or additives, with the free NCO groups present which have not been converted into uretdione groups also being able to be blocked if desired.

All methods known to those skilled in the art are suitable for blocking the free NCO groups which have not been converted into uretdione groups. Blocking agents which can be used are, in particular, phenols (e.g. phenol, nonylphenol, cresol), oximes (e.g. butanone oxime, cyclohexanone oxime), lactams (e.g. ε-caprolactam), secondary amines (e.g. diisopropylamine), pyrazoles (e.g. dimethylpyrazole), imidazoles, triazoles or malonic and acetic esters.

The largely by-product-free polyisocyanates having uretdione groups which have been prepared by the process of the invention can be used, in particular, for producing one- and two-component polyurethane coatings, optionally in mixtures with other diisocyanates or polyisocyanates of the prior art, e.g. diisocyanates or polyisocyanates containing biuret, urethane, allophanate, isocyanurate, and/or iminooxadiazine dione groups. They can also be used for reducing the viscosity of more highly viscous polyisocyanate resins.

To convert the polyisocyanates prepared according to the invention into the polyurethane, it is possible to use all compounds having at least two isocyanate-reactive functions, either individually or in any mixtures with one another (isocyanate-reactive binder).

Preference is given to using one or more isocyanate-reactive binders which are known per se in polyurethane chemistry, for example polyhydroxy compounds or polyamines. As polyhydroxy compounds, particular preference is given to using polyester polyols, polyether polyols, polyacrylate polyols and/or polycarboxylic acid polyols, optionally with addition of low molecular weight, polyhydric alcohols.

The equivalence ratio between isocyanate groups which have not been converted into uretdione groups and may, if appropriate, also have been blocked and isocyanate-reactive functions of the isocyanate-reactive binder, e.g. OH, NH or COOH, is from 0.8 to 3, preferably from 0.8 to 2.

It is possible to use an excess of isocyanate-reactive binder, since the cleavage of the uretdione ring, if appropriate at elevated temperature and/or with addition of catalyst, leads to further NCO groups being set free, and these can react with the excess of isocyanate-reactive functions. As a result, the network density of the polymer formed is increased and its properties are influenced in an advantageous fashion.

To accelerate the crosslinking reaction of the polyisocyanates prepared according to the invention with the isocyanate-reactive binder, it is possible to use all catalysts known from polyurethane chemistry. For example, it is possible to use metal salts such as dibutyl tin(IV) dilaurate, tin(II) bis(2-ethylhexanoate), bismuth(III) tris(2-ethylhexanoate), zinc (II) bis(2-ethylhexanoate) or zinc chloride and also tertiary amines such as 1,4-diazabicyclo(2.2.2)octane, triethylamine or benzyldimethylamine.

To formulate the polyurethane, the optionally blocked polyisocyanate prepared according to the invention, the isocyanate-reactive binder, catalyst(s) and, if appropriate, the customary additives such as pigments, fillers, additives, levelling agents, antifoams and/or matting agents are mixed together and homogenized in a customary mixing apparatus such as a sand mill, if appropriate with use of solvents.

Suitable solvents are all customary surface coating solvents known per se, e.g. ethyl and butyl acetate, ethylene or propylene glycol monomethyl, monoethyl or monopropyl ether acetate, 2-butanone, 4-methyl-2-pentanone, cyclohexanone, toluene, xylene, solvent naphtha, N-methylpyrrolidone, etc.

The coating compositions can be applied as a solution or from the melt or, if appropriate, in solid form (powder coatings) to the article to be coated by customary methods such as painting, rolling, pouring, spraying, dipping, the fluidized bed sintering process or by electrostatic spraying methods.

Suitable substrates are all known materials, in particular metals, wood, plastics and ceramic.

EXAMPLES

The percentages given in respect of the conversion or the resin yield are, unless indicated otherwise, calculated by dividing the amount of product obtained (polyisocyanate resin) by the amount of isocyanate monomer used and multiplying by 100. All other percentages are, unless indicated otherwise, percentages by weight.

The determination of the NCO content of the products described in the examples and comparative examples was carried out by titration in accordance with DIN 53 185.

The dynamic viscosities were determined at 23° C. using a VT 550 viscometer from Haake, Karlsruhe, Germany. It was ensured by means of measurements at different shear rates that the flow behaviour of the polyisocyanates prepared according to the invention and also that of the comparative products corresponded to that of Newtonian liquids. Reporting of the shear rate can therefore be omitted. The reported values for "mol %" and "molar ratio of different structure types to one another" were determined by NMR-spectroscopic measurements. They are always based, unless indicated otherwise, on the sum of the structure types formed by the modification reaction (oligomerization) from the previously free NCO groups of the isocyanate to be modified.

NMR measurements were carried out on DPX 400, AVC 400 and DRX 700 instruments from Bruker, Karlsruhe, Germany, using samples having a concentration of about 50% in dry $CDCl_3$ or using samples having a concentration of about 80% in $D_6$-DMSO ($^{13}$C-NMR: 100 or 176 MHz, relaxation delay: 4 sec, at least 2000 scans) and/or using samples having a concentration of about ½% in dry $C_6D_6$ ($^1$H-NMR: 400 or 700 MHz, 16 scans). As reference for the ppm scale, use was made of small amounts of tetramethylsilane in the respective solvent (δ=0 ppm) or the solvent itself ($CDCl_3$: δ= 77.0 ppm-$^{13}$C-NMR; $D_6$-DMSO: δ=43.5 ppm-$^{13}$C-NMR or $C_6D_6$: 7.15 ppm-$^1$H-NMR).

Unless indicated otherwise, the reactions were carried out using freshly degassed HDI as starting material. The expression "freshly degassed" in this case means that the HDI used had been freed of dissolved gases by stirring for at least 30 minutes under reduced pressure (<1 mbar) and subsequently blanketed with nitrogen immediately before the catalytic reaction.

All reactions were carried out under an atmosphere of dry nitrogen.

The chemicals and catalysts described in the examples and comparative examples were obtained from the companies ABCR, Aldrich, Bayer, Cytec and Fluka and were used without further purification.

Example 1

Comparison without Additive 10 g of freshly degassed HDI was stirred in the presence of 1 mol % of tributylphosphine (TBP) (based on HDI used) at 30° C. under nitrogen in a glass vessel closed by means of a septum using a magnetic stirrer bar, with the progress of the reaction being checked at regular intervals by measuring the index of refraction of the reaction mixture (at 20° C. and the frequency of the light of the D line of the sodium spectrum, $n_D^{20}$) (beginning=no conversion=$n_D^{20}$ of pure HDI=1.4523) and the HDI content of the samples being determined gas-chromatographically by the method of internal standards (determination based on DIN 55 956). The resin yield (in %) is calculated by subtracting the amount of free HDI found from 100%. This experiment was repeated 5 times and the data obtained were used for constructing a calibration curve (cf. FIG. 1).

Example 2

Comparison without Additive

The procedure of Example 1 was repeated with the tributylphosphine (TBP) being replaced by the same amount in mol % of dicyclopentylbutylphosphine (DCPBP).

As can be seen from FIG. 1, there is an almost linear relationship between the parameters conversion (resin yield) and $n_D^{20}$ of the reaction mixture over a wide range of yields of uretdione-polyisocyanate resin in the reaction mixtures, and this relationship is very similar for the two catalysts despite a significantly different selectivity (see below).

For the TBP-catalysed experiments, it can be described by Equation 1:

$$n_D^{20}=0.0495*yield\,[\%]+1.4500 \quad \text{(Equation 1)}$$

and for the DCPBP-catalysed experiments, it can be described by Equation 2:

$$n_D^{20}=0.0477*yield\,[\%]+1.4504 \quad \text{(Equation 2).}$$

Figure 2:
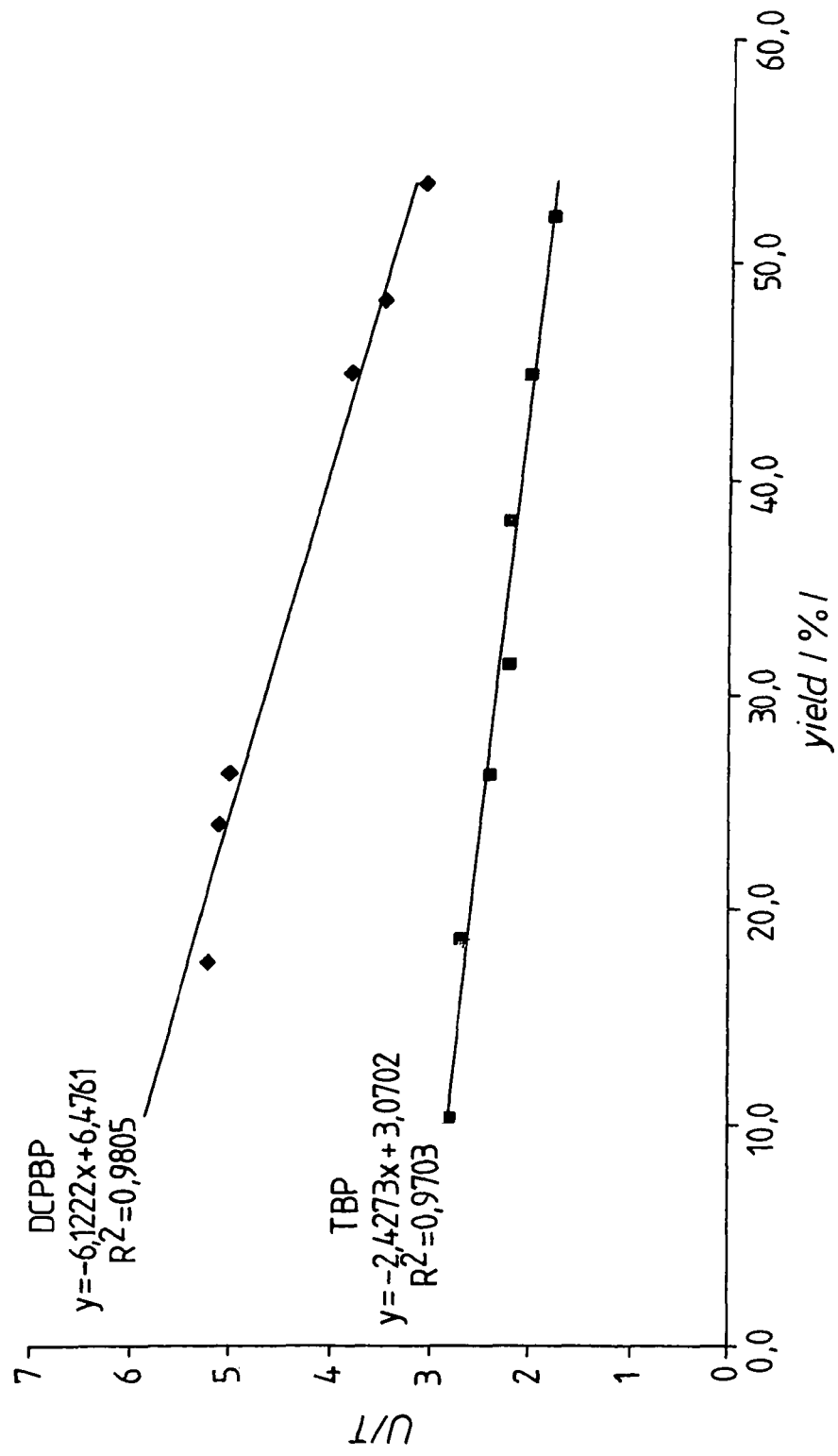
FIG. 2 is a graph showing the relationship between uretdione structures and trimer structures.

To determine the selectivity, selected samples of the reaction mixture having sufficiently different indices of refraction were admixed with a molar amount of elemental sulphur corresponding to twice the molar amount of phosphine present in order to suppress further reaction and were examined by NMR spectroscopy. To give a clearer picture, the parameter U/T was defined as the molar ratio of the uretdione structures to the sum of the two trimer structures (isocyanurate and iminooxadiazinedione) for assessment of the selectivity at the respective conversion and the two parameters were plotted against one another in a graph (FIG. 2). As can be seen, the dependence of the selectivity parameter U/T on the conversion is linear to a good approximation and can be described by Equation 3:

$$U/T = a * \text{yield} [\%] + b \quad \text{(Equation 3)}$$

where a and b have the following values in the case of TBP catalysis:

$$a = -2.4273; b = 3.0702$$

while the following values result in catalysis by means of DCPBP:

$$a = -6.1222; b = 6.4761.$$

Examples 3 to 7, According to the Invention and Examples 1, 8 to 10, Comparison 10 g of HDI, 0.12 g of TBP and 2.5 g of carbonate or additive in Examples 2-6 and 8-10 or 2 g of carbonate in Example 7 were in each case stirred at 30° C. under nitrogen in glass vessels closed by means of septa using a magnetic stirrer bar, with the progress of the reaction being checked at regular intervals by measuring the index of refraction of the reaction mixture ($n_D^{20}$). The index of refraction was determined immediately after homogenization of the respective reaction batch and defined as initial $n_D^{20}$. The difference between this value and the $n_D^{20}$ of pure HDI (1.4523) was subtracted from all further indices of refraction measured in the respective experiment and the respective conversion was determined from the resulting, corrected $n_D^{20}$ values by means of Equation 1. The structural composition (U/T) of the reaction mixtures at different degrees of conversion was determined by a procedure analogous to that described in Examples 1 and 2.

In order to present the effect of the various additives on the selectivity of the reaction as a function of the conversion measured for the individual samples in a readily comparable way, U/F values were calculated for a uniform 20% conversion (resin yield) with the aid of the U/T-conversion curves (cf. Table 3).

TABLE 3

| Ex. | Carbonate/additive | Hildebrand-parameter[(cal/cm$^3$)$^{1/2}$] | U/T at 20% resin yield |
|---|---|---|---|
| according to the invention ||||
| 3 | Ethylene carbonate | | 10.1 |
| 4 | 4-acetoxymethyl-1,3-dioxolan-2-one | | 5.4 |
| 5 | Butylene carbonate | | 4.8 |
| 6 | Trimethylene carbonate | | 4.8 |
| 7 | Diphenyl carbonate (17%) | | 4.6 |
| Comparison ||||
| 8 | Chloroform | 9.3 | 5.8 |
| 9 | NMP | 11.3 | 3.4 |
| 10 | n-Hexane | 7.3 | 2.7 |
| 1 | none | | 2.6 |

Examples 11 to 15, According to the Invention and Examples 2, 16 to 18, Comparison 10 g of HDI, 0.14 g of DCPBP and 2.5 g of carbonate or additive in Examples 11-14 and 16-18 or 2 g of carbonate in Example 15 were in each case treated in a manner analogous to the procedure in Examples 3 to 10. The results are summarized in Table 4.

TABLE 4

| Ex. | Carbonate/Additive | Hildebrand-parameter[(cal/cm$^3$)$^{1/2}$] | U/T at 20% resin yield |
|---|---|---|---|
| according to the invention ||||
| 11 | Ethylene carbonate | | 9.2 |
| 12 | Propylene carbonate | | 8.1 |
| 13 | Butylene carbonate | | 8.0 |
| 14 | Dimethyl carbonate | | 6.6 |
| 15 | Diphenyl carbonate (17%) | | 6.2 |
| Comparison ||||
| 16 | Chloroform | 9.3 | 10.2 |
| 17 | NMP | 11.3 | 5.3 |
| 18 | n-Hexane | 7.3 | 4.7 |
| 2 | None | | 5.3 |

Examples 19 and 20

According to the Invention

Dependence of the Selectivity on the Carbonate Concentration

The amount of ethylene carbonate indicated in Table 5 was firstly mixed in each case with 10 g of HDI until a clear solution was obtained. 0.14 g of DCPBP was subsequently added and the mixture was stirred at 30° C. under nitrogen in glass vessels closed by means of septa using a magnetic stirrer bar. The further procedure was identical to that in Examples 3 to 18 above. The results are shown in Table 5.

TABLE 5

| Ex. | Proportion of ethylene carbonate in the reaction mixture [%] | U/T at resin yield in [%]: | | |
|---|---|---|---|---|
| | | 20 | 35 | 50 |
| 19 | 5 | 6.4 | 5.3 | 4.1 |
| 20 | 10 | 6.4 | 5.2 | 4.5 |
| 10 | 20 | 9.2 | 6.5 | 4.8 |
| 2 | 0 (comparison) | 5.3 | 4.3 | 3.4 |

As can be seen, an increase in the uretdione selectivity is observed with an increasing proportion of carbonate in the reaction mixture. Moreover, the selectivity even with only 5% of ethylene carbonate in the reaction mixture is better than without use of the carbonate.

In summary, it is found that no reliable choice of additives which leads to an improvement in the uretdione selectivity is possible on the basis of the Hildebrand parameter as taught by JP 11228524. Furthermore, it is clear that organic carbonates, to which the Japanese published specification does not make specific reference, can be employed to increase the selectivity to uretdiones in the phosphine-catalysed NCO oligomerization.

Examples 21 to 25 (without Solvent, Comparative Experiments) and Examples 26 to 32 (with Propylene Carbonate, According to the Invention)

4200 g of HDI were placed in a double-walled flange vessel which was equipped with a stirrer, a reflux condenser connected to an inert gas supply (nitrogen/vacuum) and thermometer and was maintained at 30° C. by means of an external circuit and were degassed. After admission of nitrogen, 45.2 g of DCPBP were introduced and the mixture was stirred at 30° C. for the time indicated in Table 6. The index of refraction of the mixture ($n_D^{20}$) rose to 1.4611 as a result. The reaction mixture was subsequently worked up without prior deactivation of the phosphine. The work-up was carried out by vacuum distillation in a thin film evaporator, short path evaporator type (SPE), with preceding preevaporator (PE) (distillation data: pressure: 0.08 mbar, PE temperature: 140° C., ME temp.: 150° C., distillation time: 5-6 h), with unreacted monomer being separated off together with the active catalyst as distillate and the polyisocyanate resin containing uretdione groups being separated off as bottom product (initial cycle, Example 21). The distillate containing the active catalyst was collected in a second stirred flange apparatus which was configured identically to the first and the collected distillate was made up to the initial amount (4200 g) with fresh degassed HDI immediately after the end of the distillation. It was subsequently stirred again at 30° C. for the time indicated in Table 6 and, after measurement of the index of refraction of the reaction mixture was worked up by distillation as described above (Example 22). This procedure was repeated another three times (up to experiment 25).

Subsequently, after the distillate from the previous experiment had once again been made up to the initial amount (4200 g) and the index of refraction of the mixture had been determined, 1000 g of propylene carbonate, corresponding to 19% in the reaction mixture were added and the index of refraction of the mixture was measured again immediately after homogenization and the mixture was then dealt with as described above. The difference between the two measured indices of refraction was used to determine the corrected $n_D^\circ$. In the following experiments, the procedure described above was employed.

In experiment 31, no fresh HDI was added after the distillation, but instead only a little propylene carbonate was used for rinsing the reactor, as a result of which the proportion of propylene carbonate in the mixture increased. No propylene carbonate was in general detected in the resins (GC, detection limit about 0.03%), so that it was assumed that no loss of propylene carbonate occurred. This assumption was confirmed by the virtually identical index of refraction measured immediately after distillation and making up to the previous level in the reactor with fresh HDI. In experiment 32, the proportion of propylene carbonate was additionally increased by addition of further propylene carbonate. The distillate obtained in this experiment contained about 70% of propylene carbonate, remained a clear liquid for a period of months and was worked up to recover the catalyst.

TABLE 6

| Ex.: | Propylene carbonate [%] | Reaction time [hh:mm] | $n_D^{20}$/corr. $n_D^{20}$ | Yield [%] | NCO content [%] | Viscosity @23° C. [mPas] | Colour number [Apha] | Free HDI [%] | U/T |
|---|---|---|---|---|---|---|---|---|---|
| Comparative experiments ||||||||||
| 21 | 0 | 17:20 | 1.4611 | 24.1 | 22.9 | 165 | 40 | 0.10 | 4.8 |
| 22 | 0 | 18:05 | 1.4630 | 28.6 | 22.4 | 95 | 24 | 0.11 | 4.7 |
| 23 | 0 | 18:58 | 1.4626 | 28.4 | 22.5 | 90 | 20 | 0.07 | 4.7 |
| 24 | 0 | 18:32 | 1.4628 | 27.7 | 22.5 | 95 | 9 | 0.06 | 4.8 |
| 25 | 0 | 67:17 | 1.4751 | 54.7 | 19.7 | 240 | 5 | 0.11 | 3.3 |
| experiments according to the invention ||||||||||
| 26 | 19 | 18:59 | 1.4594 | 21.2 | 23.3 | 66 | 41 | 0.10 | 8.1 |
| 27 | 19 | 21:31 | 1.4589 | 22.9 | 23.1 | 56 | 19 | 0.09 | 8.5 |
| 28 | 19 | 16:52 | 1.4589 | 19.4 | 23.5 | 64 | 16 | 0.09 | 9.2 |
| 29 | 19 | 18:13 | 1.4592 | 20.4 | 23.4 | 56 | 14 | 0.09 | 8.3 |
| 30 | 19 | 22:53 | 1.4605 | 23.3 | 23.0 | 59 | 14 | 0.06 | 8.5 |
| 31 | 25 | 42:10 | 1.4664 | 42.1 | 21.4 | 78 | 16 | 0.11 | 6.7 |
| 32 | 48 | 62:30 | 1.4705 | 57.5 | 19.7 | 130 | 25 | 0.11 | 6.2 |

As can be seen, a significantly higher selectivity is found in the experiments 26 to 32 according to the invention than in the comparative experiments 20 to 25. After comparable reaction times or after reaching comparable indices of refraction of the crude mixture prior to distillation, significantly less viscous resins which are identical in terms of the other parameters relevant for polyisocyanates, viz. colour number, NCO content and residual monomer content and also monomer stability on storage, are obtained.

Examples 33 to 38, According to the Invention and Examples 1, 39 to 41, Comparison 10 g of HDI, 0.12 g of TBP and 2.5 g of nitrile or additive were in each case stirred at 30° C. under nitrogen in glass vessels closed by means of septa using a magnetic stirrer bar, with the progress of the reaction being checked at regular intervals by measuring the index of refraction of the reaction mixture ($n_D^{20}$). The index of refraction was determined immediately after homogenization of the respective reaction batch and defined as initial $n_D^{20}$. The difference between this value and the $n_D^{20}$ of pure HDI (1.4523) was subtracted from all further indices of refraction measured in the respective experiment and the respective conversion was determined from the resulting corrected $n_D^{20}$ values by means of Equation 1. The structural composition (U/T) of the reaction mixtures at different degrees of conversion was determined by a procedure analogous to that described in Examples 1 and 2.

In order to present the effect of the various additives on the selectivity of the reaction as a function of the conversion measured for the individual samples in a readily comparable way, U/T values were calculated for a uniform 20% conversion (resin yield) with the aid of the U/T-conversion curves (cf. Table 7).

TABLE 7

| Ex. | Nitrile/Additive | Hildebrand parameter[(cal/cm³)^(1/2)] | U/T at 20% resin yield |
|---|---|---|---|
| according to the invention ||||
| 33 | Acetonitrile | | 4.7 |
| 34 | Succinonitrile | | 6.4 |
| 35 | Adiponitrile | | 7.2 |
| 36 | Benzonitrile | | 4.3 |
| 37 | Methyl 3-cyano-propanoate | | 4.4 |
| 38 | Hexane-1,3,6-tricarbonitrile | | 5.4 |
| Comparison ||||
| 39 | Chloroform | 9.3 | 5.8 |
| 40 | NMP | 11.3 | 3.4 |
| 41 | n-Hexane | 7.3 | 2.7 |
| 1 | None | | 2.6 |

Examples 42 to 45, According to the Invention, and Examples 2, 46 to 48, Comparison 10 g of HDI, 0.14 g of DCPBP and 2.5 g of nitrile or additive were treated in a manner analogous to the procedure in Examples 33 to 39. The results are summarized in Table 8.

TABLE 8

| Ex. | Nitrile/Additive | Hildebrand parameter[(cal/cm³)^(1/2)] | U/T at 20% resin yield |
|---|---|---|---|
| according to invention ||||
| 40 | Acetonitrile | | 9.4 |
| 41 | Succinonitrile | | 12.1 |
| 42 | Adiponitrile | | 10.2 |
| 43 | Benzonitrile | | 7.9 |
| 44 | Methyl 3-cyano-propanoate | | 8.3 |
| 45 | Hexane-1,3,6-tricarbonitrile | | 11.3 |
| Comparative examples ||||
| 46 | Chloroform | 9.3 | 10.2 |
| 47 | NMP | 11.3 | 5.3 |
| 48 | n-Hexane | 7.3 | 4.7 |
| 2 | None | | 5.3 |

In summary, it is found that no reliable choice of additives which leads to an improvement in the uretdione selectivity is possible on the basis of the Hildebrand parameter as taught by JP 11228524. Furthermore, it is clear that nitriles, to which the Japanese published specification does not make specific reference, can be employed to increase the selectivity to uretdiones in the phosphine-catalysed NCO oligomerization.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for preparing polyisocyanates containing uretdione groups, in which polyisocyanates are oligomerized in the presence of a catalyst system comprising A) phosphines and B) organic nitriles or mixtures of organic nitriles and organic carbonates.

2. Process for preparing polyisocyanates containing uretdione groups according to claim 1, characterized in that tertiary phosphines are used in amounts of from 0.05 to 3 mol %, based on the sum of the amount of isocyanate, in A).

3. Process for preparing polyisocyanates containing uretdione groups according to claim 1, characterized in that carbonates having a cyclic structure are used in B).

4. Process for preparing polyisocyanates containing uretdione groups according claim 1, characterized in that 1,3-dioxolan-2-one (ethylene carbonate), 4-methyl-1,3-dioxolan-2-one (propylene carbonate), 4-ethyl-1,3-dioxolan-2-one (butylene carbonate) or glycerol carbonates are used in B), with the OH group of the exocyclic $CH_2$—OH group in the latter being capped by NCO-unreactive alkyl, acyl, aryl or aralkyl groups.

5. Process for preparing polyisocyanates containing uretdione groups according to claim 1, characterized in that organic nitriles of the general formula (I)R—CN(I) where R is a linear, branched or cyclic radical which has up to 20 carbon atoms and optionally contains heteroatoms, are used in B).

6. Process for preparing polyisocyanates containing uretdione groups according to claim 1, characterized in that acetonitrile, adiponitrile, succinonitrile and/or 1,3,5-tris (cyano)hexane are used in B).

7. Process for preparing polyisocyanates containing uretdione groups according to claim 1, characterized in that the component B) is used in amounts of from 5 to 30% by weight, based on the amount of isocyanate to be oligomerized.

8. Process for preparing polyisocyanates containing uretdione groups according to claim 1, characterized in that unreacted isocyanate and the organic carbonate or nitrile are removed by distillation subsequent to the isocyanate oligomerization.

9. Process for preparing polyisocyanates containing uretdione groups according to claim 8, characterized in that the catalyst is separated off by distillation together with the organic carbonate and/or nitrile and unreacted isocyanate.

10. Polyisocyanate mixtures obtained from a process according to claim 1.

11. Polyurethane polymers and coatings obtained using polyisocyanate mixtures according to claim 10.

* * * * *